UNITED STATES PATENT OFFICE 2,401,268

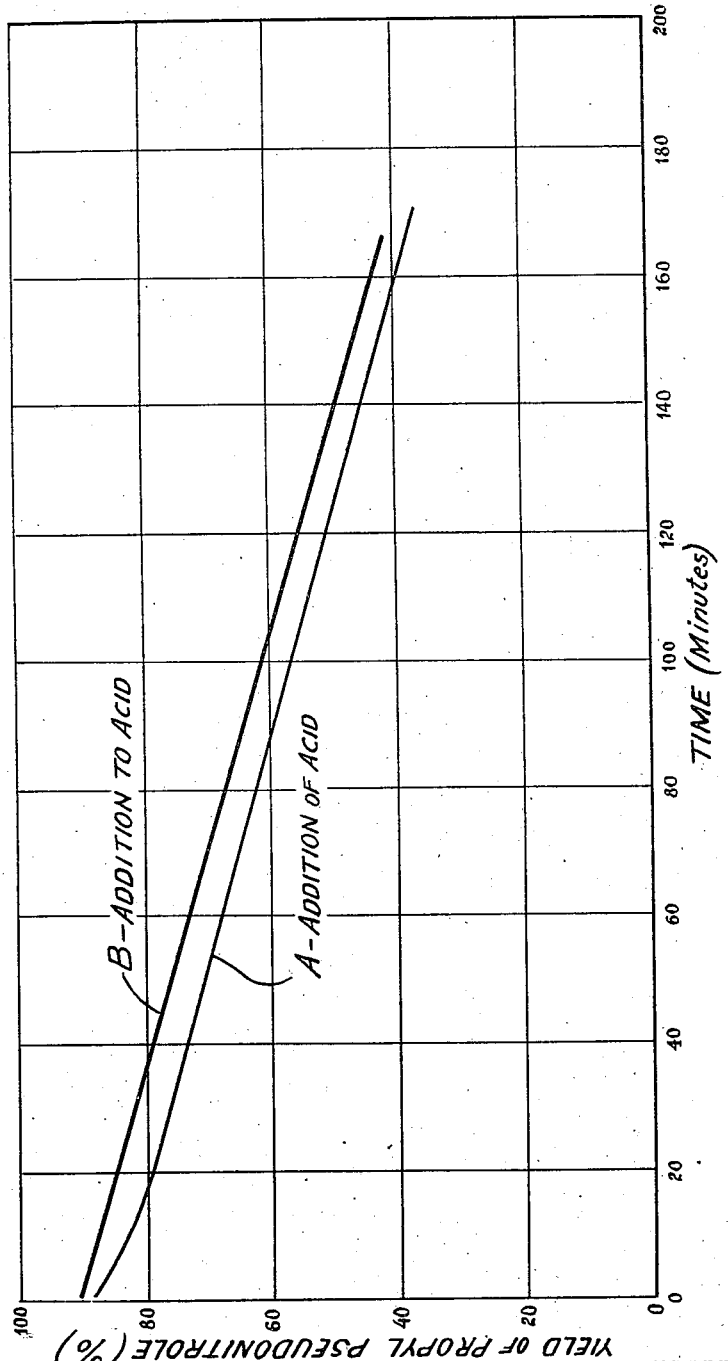

PRODUCTION OF NITROLIC ACIDS AND PSEUDONITROLES

Edwin M. Nygaard, Woodbury, N. J., assignor to Socony-Vacuum Oil Company, Incorporated, a corporation of New York Application March 16, 1945, Serial No. 583,103

13 Claims. (Cl. 260—500)

This invention has to do with an improved method for the preparation of nitrolic acids and pseudonitroles.

It has long been known in the chemical art that nitrolic acids and pseudonitroles are prepared by reaction of nitrous acid, per se or produced from a mineral acid and an inorganic nitrite, with a salt of a primary or secondary mononitroparaffin, respectively. For example, a nitrolic acid, such as propyl nitrolic acid, is obtained from primary nitropropane (1-nitropropane), as illustrated by Equation I:

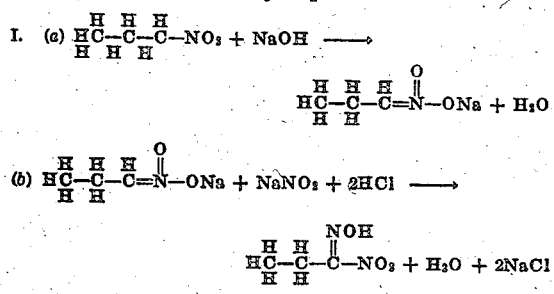

Similarly, a pseudonitrole, such as propyl pseudonitrole, is obtained from secondary nitropropane (2-nitropropane), as illustrated by Equation II:

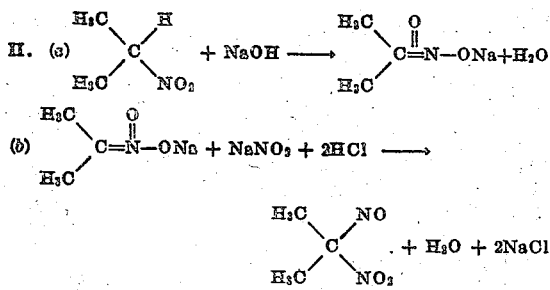

The foregoing reactions are usually carried out by dissolving a primary or secondary nitroparaffin in aqueous alkali, adding slightly more than one mole of an inorganic nitrite and, in the cold, gradually adding a dilute mineral acid.

I have now discovered that the efficiency of the foregoing established method is improved substantially by modifying the same, and it is upon this discovery that the present invention is predicated. The method contemplated herein involves the feature of controlling the rate of addition of the acid to an aqueous solution containing a salt of a primary or secondary mononitroparaffin and an inorganic nitrite such that the acid is added rapidly. Also contemplated herein is the related feature of rapidly adding an aqueous solution containing a salt of a primary or secondary mononitroparaffin and an inorganic nitrite, to the acid.

The rate of addition of the acid to the aforesaid aqueous solution, or the rate of addition of the said solution to the acid, should be rapid in order that maximum yields of nitrolic acids and pseudonitroles be realized. It has been found that when the acid is added to the said aqueous mixture over an extended period, as several hours, yields of nitrolic acids and pseudonitroles are appreciably lower. In contrast to this, when the acid was added all at once or over a very short period, as several minutes or less, high yields of the desired products were obtained. It is preferred, as demonstrated by curve A in Figure 1, discussed hereinafter, that the rate of addition of acid be more rapid than the rate determined by the addition of 0.5 mole HCl (dilute solution) to an aqueous solution of 0.2 mole $(H_3C)_2CHNO_2$, 0.22 mole NaOH (10 per cent aqueous solution) and 0.24 mole $NaNO_2$, in 30 minutes, and particularly in 15 minutes. This same relationship obtains for the rapid rate of addition of the said solution to the acid.

In the present method other precautions should also be observed in order to obtain a high degree of efficiency; although, as aforesaid, the rapid rate of addition is the salient factor here. It is desirable, for example, to use a stoichiometrical quantity, or a slight excess, of a relatively strong alkali with the nitroparaffin reactant. Relatively weak alkalies, such as ammonium hydroxide and organic amines, are not contemplated herein, inasmuch as they are apparently too weakly basic to produce the salts of the nitroparaffins necessary for reaction with said alkali nitrite and acid. Accordingly, as used here and in the claims appended hereto, the language "relatively strong alkali" refers to an alkali metal hydroxide or an alkaline earth metal hydroxide, and thus refers to an alkali suitable for use in the present method. It will be apparent to those familiar with the art that the nitroparaffin contacted with aqueous alkali is converted to its corresponding salt and, therefore, it will also be apparent that an aqueous mixture of a salt of a nitroparaffin may be used as the starting material.

Any inorganic nitrite is suitable for this method, although sodium and potassium nitrites are preferred in view of their low cost and availability. Any acid capable of liberating nitrous acid from a salt thereof, that is an acid having a dissociation constant higher than that of nitrous acid, may be used herein; although here again preference is given to those which are inexpensive and readily available namely, hydrochloric, nitric, sulfuric and phosphoric. The concentration of such acids may be varied considerably, although it is preferred that the acid have such a concentration that no appreciable heat is evolved when the acid is diluted with or added to water. The quantity of acid used may be varied over a relatively wide range, but it is desirable to use a slight excess.

Temperatures both high and low may be used when a nitroparaffin is contacted with an alkali; yet, temperatures of the order of 20–25° C. are preferred for this purpose. The same temperature conditions obtain for adding the inorganic nitrite to the nitroparaffin-aqueous alkali mixture. Temperature at this stage is not critical although temperatures in neighborhood of room temperature are generally used. Particular care should be taken, however, in the acidification procedure—that is, during the rapid addition of the mineral acid to the nitroparaffin-aqueous alkali-inorganic nitrite mixture or of the said mixture to the acid—to maintain the temperature below about 15° C. In general, temperatures of the order of about 0–5° C. are preferred for the acidification operation. The influence of temperature during this operation is demonstrated by the results of two comparable preparations of propyl pseudonitrole wherein all reaction conditions were substantially constant except the temperatures during acidification; with a temperature of about −5° C., the yield was 87.0 per cent and with a temperature of about 25° C., the yield was appreciably lower—70.2 per cent. If the temperature during acidification is allowed to increase, less nitrolic acid or pseudonitrile is found in the reaction product. In separating the nitrolic acid or pseudonitrole from the reaction mixture formed in the reaction, care must be taken that the temperature is maintained below the decomposition temperature of the said nitrolic acid or pseudonitrole, lest the yield thereof be lowered considerably. It will be apparent that the decomposition temperature will vary for the individual nitrolic acids and pseudonitroles obtained in the present method; however, it is preferred that the separation procedure be carried out at temperatures below about 15° C.

The effect of rate of addition of acid to a nitroparaffin-aqueous alkali-inorganic nitrite mixture and of the said mixture to the acid is illustrated by curves A and B, respectively, in Figure I. In curves A and B, the ordinates are yields of propyl pseudonitrole, in per cent, and the abscissae are time of addition, in minutes; the time of addition in curve A is the time of addition of acid to nitroparaffin-aqueous alkali-inorganic nitrite mixture, and in curve B the time of addition is that required for addition of the same mixture to acid. Curves A and B were obtained by keeping all reaction conditions substantially constant except time of addition which was varied over the illustrative range shown in the curves. Curve A was obtained from a number of preparations conducted in the following manner.

A 10 per cent aqueous solution of sodium hydroxide was obtained by dissolving 132 parts by weight (3.3 moles) in water. To the solution were added 267 parts by weight (3.0 moles) of 2-nitropropane and the resulting mixture was stirred until the 2-nitropropane was dissolved. The maximum temperature was about 37° C. and the resulting product was faintly cloudy and yellow. A quantity (105.2 parts by weight, equivalent to 0.22 mole of sodium hydroxide and 0.2 mole of 2-nitropropane) of the sodium hydroxide-2-nitropropane product and 16.8 parts by weight of 97 per cent sodium nitrite (equivalent to 0.236 mole NaNO₂) were placed in a 500 cc. 3-necked flask, equipped with a stirrer, thermometer and dropping funnel. The dropping funnel was fitted with tips to deliver liquid over a variable period of time. The solution in the flask was cooled by means of an ice-salt bath and to the rapidly stirred solution was added 100 parts by weight of ice. Following the addition of ice, 50.6 parts by weight (0.5 mole) of concentrated hydrochloric acid diluted with 110 parts by weight of water were delivered to the solution from the dropping funnel. The temperature of the reaction mixture in the flask ranged from −12° C. to +2° C. during the addition of acid, with the mean temperature in all cases at about −5° C. After all of the acid was added, the resulting reaction mixture was stirred for 10 minutes and then placed in a cold room, maintained at about 0° C., for 16 hours. The solid which precipitated from the reaction mixture was filtered therefrom, washed with water and dried in the air for 15 minutes and weighed. In each case the solid obtained was the dimeric form of propyl pseudonitrole. The pure dimer is colorless, melts to a blue liquid and then decomposes. When dissolved in organic liquids, such as benzene, carbon tetrachloride or acetic acid, a deep blue color is imparted to the organic liquids. This color change is believed to be the result of the dimer changing to the monomer. The melting point of the solid product is 75° C., and this is the value reported in the literature for propyl pseudonitrole.

Curve A demonstrates the profound effect of the rate of addition of acid to a nitroparaffin-aqueous alkali-inorganic nitrite solution; for example, when the addition was completed in about 2 minutes, the yield was 87.0 per cent; contrasted with this are other typical addition periods of about 100 minutes and 160 minutes whereupon the yields were only 56 per cent and 40 per cent, respectively.

Curve B was obtained in the same manner as was curve A except that in the several preparations of propyl pseudonitrole the nitroparaffin-aqueous alkali-inorganic nitrite was added to the acid over varying periods of time. Curve B also illustrates the influence of rate of addition upon the efficiency of this method; by way of illustration, with an addition period of 1 minute, the yield of propyl pseudonitrole was 90.7 per cent, whereas at 64 minutes, the yield was only 72 per cent.

It should be clear from the foregoing that the present method is a valuable means for preparing nitrolic acids and pseudonitroles. As is well known in the art, such compounds are valuable intermediates in chemical synthesis; and recently, these compounds have been found to be extremely effective ignition improvers in Diesel-type fuels.

The method contemplated herein is useful not only for the preparation of unsubstituted nitrolic acids and unsubstituted pseudonitroles, but is useful as well for the preparation of various substituted analogs. For example, halogen-substituted nitrolic acids and pseudonitroles may be prepared from their corresponding halogen-substituted primary and secondary nitroparaffins, respectively. In general, any substituent group such as halogen, keto, amino, hydroxyl, etc. may be present on the nitroparaffin reactant, and thus present on the resulting nitrolic acid or pseudonitrole, so long as the substituent group does not interfere with the formation of the alkali metal or alkaline earth metal salt of the nitroparaffin.

Although the present invention has been illustrated hereinabove by the preparation of specific nitrolic acids and pseudonitroles, it is to be understood that these specific embodiments are but representative of my improved method for the preparation of compounds of the broad classes of nitrolic acids and pseudonitroles. Accordingly, the present invention is not to be construed as limited thereto but is to be broadly construed in the light of the defining language of the appended claims.

I claim:

1. The method of preparation of a compound selected from the group consisting of a nitrolic acid and a pseudonitrole, which comprises: contacting a mononitroparaffin selected from the group consisting of a primary and a secondary mononitroparaffin with a relatively strong aqueous alkali and an inorganic nitrite; rapidly contacting the mononitroparaffin-aqueous alkali-inorganic nitrite mixture formed in the initial operation and an acid capable of liberating nitrous acid from a salt thereof, at a temperature below about 15° C., whereby said compound is formed; and separating said compound from the reaction mixture obtained in the preceding operation at a temperature below the decomposition temperature of said compound.

2. The method of preparation of a compound selected from the group consisting of a nitrolic acid and a pseudonitrole, which comprises: contacting a mononitroparaffin selected from the group consisting of a primary and a secondary mononitroparaffin with a relatively strong aqueous alkali and an inorganic nitrite; rapidly adding an acid capable of liberating nitrous acid from a salt thereof to the mononitroparaffin-aqueous alkali-inorganic nitrite mixture formed in the initial operation, at a temperature below about 15° C., whereby said compound is formed; and separating said compound from the reaction mixture obtained in the preceding operation at a temperature below the decomposition temperature of said compound.

3. The method of preparation of a nitrolic acid, which comprises: contacting a primary mononitroparaffin with a relatively strong aqueous alkali and an inorganic nitrite; rapidly adding an acid capable of liberating nitrous acid from a salt thereof to the mononitroparaffin-aqueous alkali-inorganic nitrite mixture formed in the initial operation, at a temperature below about 15° C., whereby said nitrolic acid is formed; and separating said nitrolic acid from the reaction mixture formed in the preceding operation at a temperature below the decomposition temperature thereof.

4. The method of preparation of a pseudonitrole, which comprises: contacting a secondary mononitroparaffin with a relatively strong aqueous alkali and an inorganic nitrite; rapidly adding an acid capable of liberating nitrous acid from a salt thereof to the mononitroparaffin-aqueous alkali-inorganic nitrite mixture formed in the initial operation, at a temperature below about 15° C., whereby said pseudonitrole is formed; and separating said pseudonitrole from the reaction mixture formed in the preceding operation at a temperature below the decomposition temperature thereof.

5. The method of preparation of propyl pseudonitrole, which comprises: contacting 2-nitropropane with an aqueous alkali metal hydroxide and an alkali nitrite; rapidly adding an acid capable of liberating nitrous acid from a salt thereof to the 2-nitropropane-aqueous alkali metal hydroxide-alkali nitrite mixture formed in the initial operation, at a temperature below about 15° C., whereby propyl pseudonitrole is formed; and separating, at a temperature below about 15° C., said propyl pseudonitrole from the reaction mixture formed in the preceding operation.

6. The method of preparation of propyl pseudonitrole, which comprises: contacting a molar equivalent of 2-nitropropane with substantially a molar equivalent of a relatively strong aqueous alkali and substantially a molar equivalent of an inorganic nitrite; adding substantially two equivalents of an acid capable of liberating nitrous acid from a salt thereof to the 2-nitropropane-aqueous alkali-inorganic nitrite formed in the initial operation, at a temperature below about 15° C., whereby said propyl pseudonitrole is formed, the addition of said acid being completed in less than about thirty minutes; and separating, at a temperature below about 15° C., said propyl pseudonitrole from the reaction mixture formed in the preceding operation.

7. The method of preparation of propyl pseudonitrole, which comprises: contacting 2-nitropropane with an aqueous alkali metal hydroxide and an alkali nitrite; adding an acid capable of liberating nitrous acid from a salt thereof to the 2-nitropropane-aqueous alkali metal hydroxide-alkali nitrite mixture formed in the initial operation, at a temperature below about 15° C., whereby said propyl pseudonitrole is formed, the rate of addition of said acid to said mixture being faster than the rate of addition determined by the addition of substantially 0.5 molar equivalent of hydrochloric acid to said mixture containing 0.2 molar equivalent of 2-nitropropane, 0.22 molar equivalent of sodium hydroxide and 0.24 molar equivalent of sodium nitrite, in about thirty minutes; and separating, at a temperature below about 15° C., said propyl pseudonitrole from the reaction mixture formed in the preceding operation.

8. The method of preparation of a compound selected from the group consisting of a nitrolic acid and a pseudonitrole, which comprises: contacting a mononitroparaffin selected from the group consisting of a primary and a secondary mononitroparaffin with a relatively strong aqueous alkali and an inorganic nitrite; rapidly adding the mononitroparaffin-aqueous alkali-inorganic nitrite mixture formed in the initial operation to an acid capable of liberating nitrous acid from a salt thereof, at a temperature below about 15° C., whereby said compound is formed; and separating said compound from the reaction mixture obtained in the preceding operation at a temperature below the decomposition temperature of said compound.

9. The method of preparation of a nitrolic acid, which comprises: contacting a primary mononitroparaffin with a relatively strong aqueous alkali and an inorganic nitrite; rapidly adding the mononitroparaffin-aqueous alkali-inorganic nitrite mixture formed in the initial operation to an acid capable of liberating nitrous acid from a salt thereof, at a temperature below about 15° C., whereby said nitrolic acid is formed; and separating said nitrolic acid from the reaction mixture formed in the preceding operation at a temperature below the decomposition temperature thereof.

10. The method of preparation of a pseudonitrole, which comprises: contacting a secondary mononitroparaffin with a relatively strong aqueous alkali and an inorganic nitrite; rapidly adding the mononitroparaffin-aqueous alkali-inorganic nitrite mixture formed in the initial operation to an acid capable of liberating nitrous acid from a salt thereof, at a temperature below about 15° C., whereby said pseudonitrole is formed; and separating said pseudonitrole from the reaction mixture formed in the preceding operation at a temperature below the decomposition temperature thereof.

11. The method of preparation of propyl pseudonitrole, which comprises: contacting 2-nitropropane with an aqueous alkali metal hydroxide and an alkali nitrite; rapidly adding the 2-nitropropane-aqueous alkali metal hydroxide-alkali nitrite mixture formed in the initial operation to an acid capable of liberating nitrous acid from a salt thereof, at a temperature below about 15° C., whereby said propyl pseudonitrole is formed; and separating, at a temperature below about 15° C., said propyl pseudonitrole from the reaction mixture formed in the preceding operation.

12. The method of preparation of propyl pseudonitrole, which comprises: contacting a molar equivalent of 2-nitropropane with substantially a molar equivalent of a relatively strong aqueous alkali and substantially a molar equivalent of an inorganic nitrite; adding the 2-nitropropane-aqueous alkali-inorganic nitrite mixture formed in the initial operation to substantially two equivalents of an acid capable of liberating nitrous acid from a salt thereof, at a temperature below about 15° C., whereby said propyl pseudonitrole is formed, the addition of said mixture being completed in less than about thirty minutes; and separating said propyl pseudonitrole from the reaction mixture formed in the preceding operation at a temperature below about 15° C.

13. The method of preparation of propyl pseudonitrole, which comprises: contacting 2-nitropropane with an aqueous alkali metal hydroxide and an alkali nitrite; adding the 2-nitropropane-aqueous alkali metal hydroxide-alkali nitrite mixture formed in the initial operation to an acid capable of liberating nitrous acid from a salt thereof, at a temperature below about 15° C., whereby said propyl pseudonitrole is formed, the rate of addition of said mixture to said acid being faster than the rate of addition determined by the addition of said mixture containing 0.2 molar equivalent of 2-nitropropane, 0.22 molar equivalent of sodium hydroxide and 0.24 molar equivalent of sodium nitrite, to substantially 0.5 molar equivalent of hydrochloric acid, in about thirty minutes; and separating, at a temperature below about 15° C., said propyl pseudonitrole from the reaction mixture formed in the preceding operation.

EDWIN M. NYGAARD.

Certificate of Correction

Patent No. 2,401,268.  May 28, 1946.

EDWIN M. NYGAARD

It is hereby certified that errors appear in the printed specification of the above numbered patent requiring correction as follows: Page 1, first column, lines 13 to 15, for that portion of Equation I reading

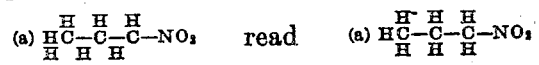

lines 29 to 31, Equation II, for

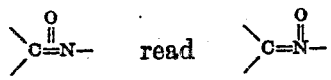

page 2, first column, line 38, for "pseudonitrile" read *pseudonitrole*; and that the said Letters Patent should be read with these corrections therein that the same may conform to the record of the case in the Patent Office.

Signed and sealed this 17th day of September, A. D. 1946.

[SEAL]

LESLIE FRAZER,
*First Assistant Commissioner of Patents.*